United States Patent
Wei

(10) Patent No.: US 10,237,288 B2
(45) Date of Patent: Mar. 19, 2019

(54) METHOD FOR DEEP DATA INSPECTION OVER AN INDUSTRIAL INTERNET FIELD BROADBAND BUS

(71) Applicant: KYLAND TECHNOLOGY CO., LTD., Beijing (CN)

(72) Inventor: Jinju Wei, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 224 days.

(21) Appl. No.: 15/263,845

(22) Filed: Sep. 13, 2016

(65) Prior Publication Data

US 2017/0374085 A1 Dec. 28, 2017

(30) Foreign Application Priority Data

Jun. 23, 2016 (CN) .......................... 2016 1 0466509

(51) Int. Cl.
*H04L 29/06* (2006.01)
*H04L 29/12* (2006.01)
(Continued)

(52) U.S. Cl.
CPC ...... *H04L 63/1416* (2013.01); *H04L 12/2801* (2013.01); *H04L 12/40013* (2013.01);
(Continued)

(58) Field of Classification Search
None
See application file for complete search history.

(56) References Cited

U.S. PATENT DOCUMENTS 7,007,194 B1 * 2/2006 Wilson .................. G06F 11/201
　　　　　　　　　　　　　　　　　　　　　711/112
7,411,916 B2 * 8/2008 Sakov ................. H04L 12/2856
　　　　　　　　　　　　　　　　　　　　　370/252

(Continued)

FOREIGN PATENT DOCUMENTS

CH　　　202600464 U　　12/2012
CH　　　103438548 B　　12/2015
(Continued)

OTHER PUBLICATIONS

Plummer, "An Ethernet Address Resolution Protocol or Converting Network Protocol Addresses for transmission on Ethernet Hardware," Network Working Group RFC 1717, Internet Society, Nov. 1982, pp. 1-11.

(Continued)

*Primary Examiner* — Kaveh Abrishamkar
(74) *Attorney, Agent, or Firm* — Arent Fox LLP; Michael Fainberg

(57) ABSTRACT

The invention discloses a method for deep data inspection over an industrial internet field broadband bus, the method including: obtaining, by a first node, a message to be transmitted; judging, by the first node, whether a bus device address in the message to be transmitted lies in a preset range of bus device addresses; and if the bus device address lies in the preset range of bus device addresses, then transmitting, by the first node, the message to be transmitted to a processor of the first node. The first node only forwards the message to be transmitted, lying in the preset range of bus device addresses to thereby improve the security of transmitting the message.

9 Claims, 5 Drawing Sheets

(51) Int. Cl.
  *H04L 12/66* (2006.01)
  *H04L 12/28* (2006.01)
  *H04L 12/40* (2006.01)
(52) U.S. Cl.
  CPC ............ *H04L 12/66* (2013.01); *H04L 61/106* (2013.01); *H04L 63/0876* (2013.01); *H04L 63/1425* (2013.01); *H04L 61/2038* (2013.01); *H04L 69/08* (2013.01)

(56) References Cited

U.S. PATENT DOCUMENTS

| | | | | |
|---|---|---|---|---|
| 8,433,342 | B1* | 4/2013 | Boyle | H04L 67/20 455/456.3 |
| 2007/0147383 | A1* | 6/2007 | Kojima | H04L 63/0227 370/392 |
| 2008/0005264 | A1* | 1/2008 | Brunell | G06F 21/6254 709/217 |
| 2012/0203909 | A1* | 8/2012 | Kavanaugh | H04L 61/2517 709/226 |
| 2013/0343390 | A1* | 12/2013 | Moriarty | H04L 43/0852 370/392 |
| 2015/0222445 | A1* | 8/2015 | Iyer | H04L 12/185 370/390 |
| 2016/0094578 | A1 | 3/2016 | McQuillan et al. | |
| 2016/0380749 | A1* | 12/2016 | Jose | H04L 7/0008 709/248 |
| 2017/0026774 | A1* | 1/2017 | Koshimizu | H04W 4/70 |

FOREIGN PATENT DOCUMENTS

| | | |
|---|---|---|
| EP | 3010183 A1 | 4/2016 |
| JP | 2012-034273 A1 | 2/2012 |
| WO | 01/45348 A2 | 6/2001 |

OTHER PUBLICATIONS

Hao et al., "Optimize and Design Fieldbus Network Based Embedded Systems," 2nd International Conference on Industrial and Information Systems, 2010, pp. 420-423.

Kobayashi et al., "Evaluation of Whitelist-based Packet Filtering for Industrial Control System," Computer Security Symposium, Oct. 2014, pp. 1-10.

* cited by examiner

METHOD FOR DEEP DATA INSPECTION OVER AN INDUSTRIAL INTERNET FIELD BROADBAND BUS

CROSS-REFERENCE TO RELATED APPLICATIONS

This application claims the priority to Chinese Patent Application No. 201610466509.4, filed on Jun. 23, 2016, the content of which is hereby incorporated by reference in its entirety.

FIELD

The present invention relates to the field of information processing, and particularly to a method for deep data inspection over an industrial internet field broadband bus.

BACKGROUND

As the Internet technologies are being developed, various buses have been widely applied to industry field automatization to supervise by a control end an industry field in a real-time manner, and there are different data transmission requirements in different application fields, where particularly the security performance of servo systems, robots, and other systems requiring high precision may depend directly upon the accuracy of field data and control data; and network intrusion events frequently occur over the Internet, where virus information is transmitted to a bus system in which there is a bug in security detection so that the system may break down, thus endangering the security of a nation, a corporate, and an individual due to these events.

There has been disclosed in the Invention of Patent CN103438548B a mobile terminal system and method for remotely controlling a central air conditioner, where air conditioner control software in the mobile terminal is bound in a one-to-one manner and communicates with the centralized controller according to an MAC address and an IP address input by a user to thereby avoid the mobile terminal from operating on a wrong object so as to improve the security and reliability of controlling the central air condition, but transmission of data in the message format including the MAC address and the IP address has failed to accommodate real-time transmission of bus information as required at present, and pure one-to-one binding of the addresses may not guarantee the security of information in the message.

There has been disclosed in the Invention of Patent CN202600464U an intelligent building control, supervision and management platform, where the system includes an address judging module configured to judge whether building device controller address information in a control instruction is correct, and to determine a communication protocol type, where different address encoding types are applicable to different communication protocols. This solution only relates to judgment on the conventional bus device address encoding type, but does not concern any particular address encoding type setting method, and an application thereof to detection of data depth over a special broadband bus.

In summary, the bus in the prior art may suffer from a hidden risk of security in transmission.

SUMMARY

Embodiments of the invention provide a method for deep data inspection over an industrial internet field broadband bus so as to address the problem of a hidden risk of security in transmission over the bus in the prior art.

An embodiment of the invention provides a method for deep data inspection over an industrial internet field broadband bus, the method being applicable to a two-wire data transfer network in which respective nodes are connected over the network according to their IP address, and the respective nodes are synchronized in clock using a clock synchronization protocol, wherein the method includes:

obtaining, by a first node, a message to be transmitted;

judging, by the first node, whether a bus device address in the message to be transmitted lies in a preset range of bus device addresses; and if the bus device address lies in the preset range of bus device addresses, then transmitting, by the first node, the message to be transmitted to a processor of the first node.

Furthermore after judging, by the first node, whether the bus device address in the message to be transmitted lies in the preset range of bus device addresses, the method further includes:

if the bus device address does not lie in the preset range of bus device addresses, then discarding, by the first node, the message to be transmitted.

Furthermore before obtaining, by the first node, the message to be transmitted, the method further includes:

determining, by the first node, the preset range of bus device addresses according to configuration information.

Furthermore obtaining, by the first node, the message to be transmitted includes:

receiving, by the first node, the message to be transmitted, transmitted by a second node;

wherein the message to be transmitted is a message generated by the second node obtaining a data message, and then determining a bus device address corresponding to a destination IP address and a destination MAC address in the data message using a three-dimension correspondence relationship between a bus device address, an MAC address, and an IP address according to the destination IP address and the destination MAC address in the data message, and replacing the destination IP address and the destination MAC address in the data message with the bus device address.

Furthermore after judging, by the first node, whether the bus device address in the message to be transmitted lies in the preset range of bus device addresses, the method further includes:

determining, by the first node, that the destination IP address and the destination MAC address of the message to be transmitted are legal addresses.

Furthermore after determining, by the first node, that the destination IP address and the destination MAC address of the message to be transmitted are legal addresses, the method further includes:

determining, by the first node, the destination IP address and the destination MAC address in the message to be transmitted, corresponding to the bus device address in the message to be transmitted, according to the three-dimension correspondence relationship; and replacing, by the first node, the bus device address in the message to be transmitted, with the destination IP address and the destination MAC address.

Furthermore if the first node is a bus controller, then:

before obtaining, by the first node, the message to be transmitted, the method further includes:

receiving, by the first node, an IP address acquisition request including an MAC address of each of other nodes; and allocating, by the first node, an IP address and a bus device address for each of the other nodes, and determining a three-dimension correspondence relationship between the allocated IP address and bus device address, and the MAC address.

Furthermore if the first node is the bus controller, then:

after replacing, by the first node, the bus device address in the message to be transmitted, with the destination IP address and the destination MAC address, the method further includes:

judging, by the bus controller, whether an industry control protocol in the message to be transmitted lies in an industrial control whitelist, and if so, then transmitting, by the bus controller, the message to be transmitted;

otherwise, discarding, by the bus controller, the message to be transmitted.

Furthermore if the first node is a bus terminal, then:

obtaining, by the first node, the message to be transmitted includes:

receiving, by the first node, the message to be transmitted, transmitted by a second node, wherein the message to be transmitted is a message generated by the second node obtaining a data message, and determining that an industry control protocol in the data message lies in the industrial control whitelist, and then replacing a destination IP address and a destination MAC address in the data message with the bus device address.

Furthermore the first node is a bus controller or a bus terminal, and the second node is a bus controller or a bus terminal; and the first node and the second node are not the bus controller or the bus terminal at the same time.

Furthermore the clock synchronization protocol includes any one of:

the Precision Time Protocol (PTP), the Network Time Protocol (NTP), and the Simple Network Time Protocol (SNTP).

An advantageous effect of the invention lies in that the first node obtains the bus device address in the message to be transmitted, and judges whether the bus device address lies in the preset range of bus device addresses, and if so, then the first node determines that the message to be transmitted is a legal message, that is, the first node can control in effect the received message to be transmitted, to be forwarded so that the first node only forwards the message to be transmitted in the preset range of bus device address to thereby improve the security of transmitting the message.

BRIEF DESCRIPTION OF THE DRAWINGS

In order to make the technical solutions according to the embodiments of the invention art more apparent, the drawings to which a description of the embodiments refers will be briefly introduced below, and apparently the drawings to be described below are merely illustrative of some of the embodiments of the invention, and those ordinarily skilled in the art can derive from these drawings other drawings without any inventive effort. In the drawings.

DETAILED DESCRIPTION OF THE EMBODIMENTS

The invention provides a method for deep data inspection over an industrial internet field broadband bus, the method being applicable to a two-wire data transfer network. A node obtains a bus device address in a message to be transmitted, and judges whether the bus device address lies in a preset range of bus device addresses, and if so, then the node determines that the message to be transmitted is a legal message, that is, the node can control in effect the received message to be transmitted, to be forwarded so that the node may only forward the message to be transmitted in the preset range of bus device address to thereby improve the security of transmitting the message.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1:
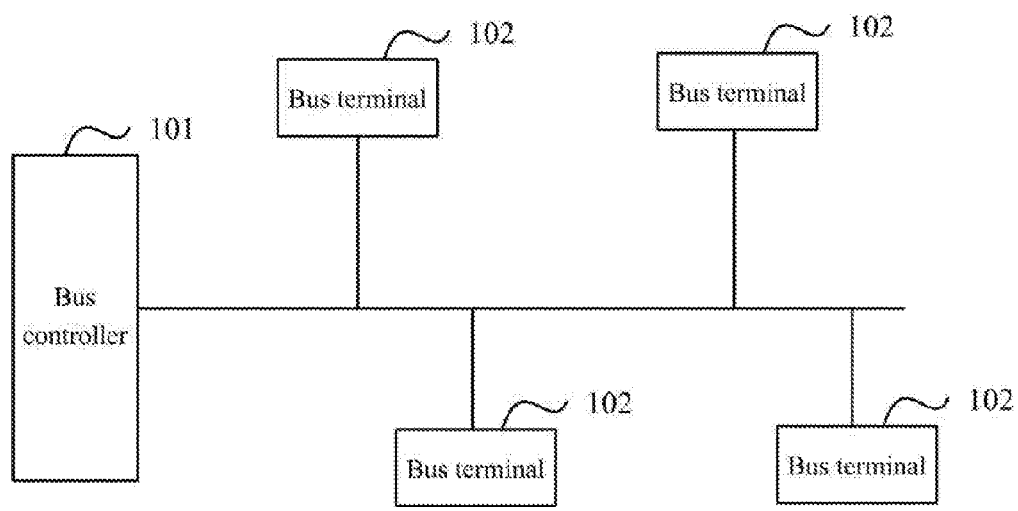
FIG. 1 is a first schematic architectural diagram of a two-wire data transfer network according to an embodiment of the invention.

As illustrated in FIG. 1 which is a first schematic architectural diagram of a two-wire data transfer network according to an embodiment of the invention, the two-wire data transfer network includes a bus controller 101 and at least one bus terminal 102, where the bus controller 101 and the respective bus terminals 102 are connected over the two-wire data transfer network. In the embodiment of the invention, a node can be the bus controller or a bus terminal.

Figure 2:
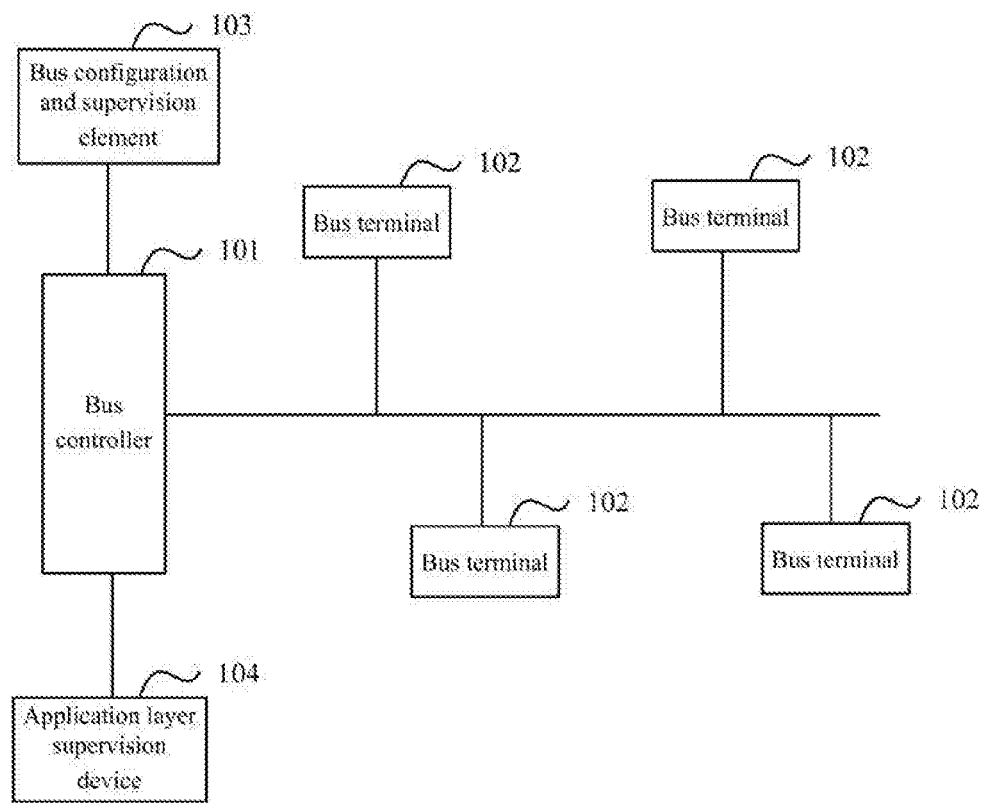
FIG. 2 is a second schematic architectural diagram of a two-wire data transfer network according to an embodiment of the invention.

As illustrated in FIG. 2 which is a second schematic architectural diagram of a two-wire data transfer network according to an embodiment of the invention, the two-wire data transfer network further includes a bus configuration and supervision element 103, connected with the bus controller 101, configured to transmit configuration information or a supervision instruction for at least one device over the two-wire data transfer network to the bus controller 101 so that the bus controller 101 transmits the configuration information to the corresponding device; and to receive operating state information, transmitted by the bus controller 101, generated by at least one device over the two-wire data transfer network. The two-wire data transfer network further includes an application supervision device 104, connected with the bus controller 101, configured to acquire data of, and to control in a real-time manner the bus controller 101 and the respective bus terminals 102.

Figure 3:
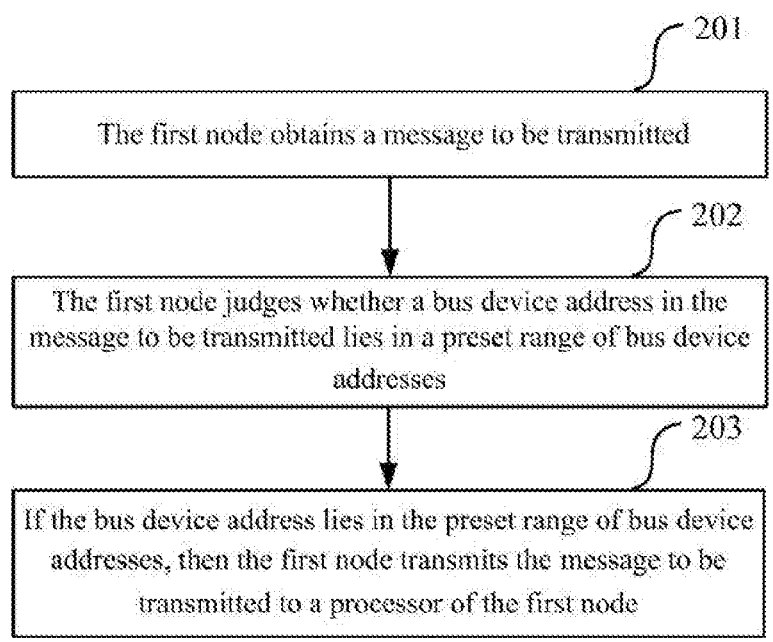
FIG. 3 is a flow chart of a method for deep data inspection over an industrial internet field broadband bus according to an embodiment of the invention.

FIG. 3 illustrates a method for deep data inspection over an industrial internet field broadband bus according to an embodiment of the invention, the method including:

In the operation 201, a first node obtains a message to be transmitted;

In the operation 202, the first node judges whether a bus device address in the message to be transmitted lies in a preset range of bus device addresses; and In the operation 203, if the bus device address lies in the preset range of bus device addresses, then the first node transmits the message to be transmitted to a processor of the node.

In the operation 201, if the first node is a bus controller, then the message to be transmitted, obtained by the first node may be a data message transmitted by an external network to a two-wire data transfer network, or may be a message to be transmitted, received by the bus controller, transmitted by a bus terminal to the external network.

In an embodiment of the invention, if the first node is a bus controller, then the bus controller may further convert data over the bus to be transmitted to the outside into a message in another network format, e.g., Profibus, Modbus, CANopen, RS485/CAN, or another bus format, so that the industry internet broadband bus as proposed in the invention can be interconnected with the other filed bus network.

In the operation 202, all the addresses in the preset range of bus device addresses are regarded as legal addresses, and addresses which do not lie in the range of bus device addresses are illegal addresses; and optionally in an embodiment of the invention, the preset range of bus device addresses is a range of bus device addresses determined by the bus controller while the two-wire data transfer network is being deployed, and particularly if the bus controller receives configuration information to be transmitted to the bus terminal, where the configuration information includes an IP address acquisition request transmitted by the bus terminal to the bus controller, and the IP address acquisition request includes an MAC address of the bus terminal, then the bus controller may allocate an IP address and a bus device address for the bus terminal.

In an embodiment of the invention, as illustrated in FIG. 1, for example, there are four bus terminals which are a bus terminal A, a bus terminal B, a bus terminal C, and a bus terminal D respectively, where the bus terminal A transmits an IP address acquisition request to the bus controller, where the IP address acquisition request includes an MAC address 00-01-6C-06-A6-29 of the bus terminal A, and the bus controller allocates an IP address of 111.112.0.1 and a bus device address of 0x34 for the bus terminal A. Alike the bus controller allocates IP addresses and bus device addresses for the other bus terminals.

In an embodiment of the invention, the bus controller learns the MAC addresses and the IP addresses of all the bus terminals over the two-wire data transfer network, and binds the MAC addresses and the IP addresses of the bus terminals with the bus device addresses of the bus terminals, thus resulting in a correspondence relationship table as depicted in Table 1:

TABLE 1

Three-dimension correspondence table between a bus device address, an MAC address, and an IP address

| Bus device addresses | MAC addresses | IP addresses |
|---|---|---|
| 0x34 | 00-01-6C-06-A6-29 | 111.112.0.1 |
| 0x35 | 01-00-23-5A-46-09 | 111.112.0.2 |
| 0x36 | 12-34-56-AB-CD-EF | 111.112.0.3 |
| 0x37 | 13-25-78-EE-FF-DD | 111.112.0.4 |

Optionally in an embodiment of the invention, the bus controller transmits the three-correspondence relationships corresponding to the bus terminals in Table 1 to the respective bus terminals, for example, in an embodiment of the invention, the bus controller transmits Table 2 to the bus terminal A.

TABLE 2

Three-dimension correspondence table transmitted by the bus controlled to the bus terminal A

| Bus device address | MAC address | IP address |
|---|---|---|
| 0x34 | 00-01-6C-06-A6-29 | 111.112.0.1 |

In an embodiment of the invention, upon reception of the message to be transmitted, the bus controller or the bus terminal firstly obtains a destination MAC address and a destination IP address in the message to be transmitted, and then searches Table 1 for a bus device address corresponding to the destination MAC address and the destination IP address, and if the bus device address lies in the range of bus device addresses in Table 1, then the bus controller or the bus terminal may determine that the message to be transmitted is a legal message.

For example, in an embodiment of the invention, the bus controller determines the destination MAC address and the destination IP address in the received message to be transmitted as 00-01-6C-06-A6-29 and 111.112.0.1 respectively, then the bus controller can determine from Table 1 the bus device address of 0x34 corresponding to the destination MAC address of 00-01-6C-06-A6-29 and the destination IP address of 111.112.0.1, and thus determine that the message to be transmitted is a legal message.

In the operation 203, in an embodiment of the invention, the first node can be the bus controller or a bus terminal, and in an embodiment of the invention, the bus controller and the bus terminal process the message to be transmitted at the physical layer as described above, and after the message to be transmitted is processed, the bus controller and the bus terminal may transmit the message to be transmitted to the upper layer above a physical layer of the bus controller and the bus terminal, i.e., the processor of the bus controller and the bus terminal.

In the operation 203, if the first node determines that the message to be transmitted is a legal message, then the first node may transmit the message to be transmitted to a physical layer of the bus controller and the bus terminal, i.e., a processor of the bus controller and the bus terminal.

In an embodiment of the invention, if the first node determines that the bus device address of the message to be transmitted does not lie in the preset range of bus device addresses, then the first node may determine that there is a hidden risk of security in the message to be transmitted, and thus discard the message to be transmitted. In an embodiment of the invention, since the message to be transmitted can be transmitted from the external network to the two-wire data transfer network, or can be transmitted from the two-wire data transfer network to the external network, the method for real-time detection of data depth over the bus in two transmission modes will be described below respectively.

First Embodiment

In an embodiment of the invention, the first node is a bus terminal, and a second node is the bus controller; and if the message to be transmitted is transmitted from the external network to the two-wire data transfer network, then the bus controller may firstly determine that an industry control protocol of the message to be transmitted, transmitted from the external network lies in an industrial control whitelist, upon reception of the message to be transmitted. In an embodiment of the invention, a message format of the message to be transmitted as depicted in Table 3 includes an industry control protocol header, a TCP header, an IP header, data information, and a Frame Check Sequence (FCS).

TABLE 3

Message format of the message to be transmitted

| Industry control protocol header | IP header | TCP header | Data information | FCS |
|---|---|---|---|---|

In an embodiment of the invention, it can be determined from the industry control protocol header in the parsed message to be transmitted whether the message to be transmitted lies in the industrial control whitelist, where the industrial control whitelist includes Ethernet/IP, PROFINET, POWERLINK, EtherCAT, SERCOSIII, and other industry control protocols in an embodiment of the invention.

In an embodiment of the invention, if the bus controller determines that the message to be transmitted does not lie in the industrial control whitelist, then the bus controller may determine that there is a hidden risk of security in the message to be transmitted, and discard the message to be transmitted.

In an embodiment of the invention, if the bus controller determines that the message to be transmitted lies in the industrial control whitelist, then in order to alleviate the problem of credit occupancy of the message to be transmitted over the two-wire data transfer network, if the message to be transmitted is transmitted from the external network to the two-wire data transfer network, that is, the first node is the bus controller, and the obtained message to be transmitted is transmitted from the external network, then the bus controller determining that the message to be transmitted lies in the industrial control whitelist may replace the IP address and the MAC address of the message to be transmitted, with the bus device address according to the correspondence relationship between a destination IP address and an MAC address of the message to be transmitted, and a bus device address as depicted in Table 1 to thereby reduce in effect the length of the message to be transmitted.

For example, in an embodiment of the invention, the bus controller receives the message to be transmitted in the data format as depicted in Table 3 including the industry control protocol header, the IP header, the TCP header, the data information, and the FCS.

In an embodiment of the invention, the industry control protocol header, the IP header, and the TCP header of the message to be transmitted are replaced with the bus device address corresponding to the destination IP address and the MAC address of the message to be transmitted, thus resulting in a new message as depicted in Table 4:

TABLE 4

Message format table of new message

| Bus device address | Data information | FCS |
|---|---|---|

In the embodiment above of the invention, optionally it is determined that the IP header of the message to be transmitted is the destination IP address of the message to be transmitted, and the TCP header of the message to be transmitted is the destination MAC address of the message to be transmitted; and since the industry control protocol in the message to be transmitted has been detected, in order to further reduce the length of the message to be transmitted over the two-wire network, optionally in an embodiment of the invention, the industry control protocol header in the message to be transmitted is also be discarded, thus resulting in the new message as depicted in Table 4.

In an embodiment of the invention, in an example where the bus controller receives the message to be transmitted, with the destination IP address of 112.112.0.1, and the destination MAC address of 00-01-6C-06-A6-29, the bus controller can determine from Table 1 the bus device address of 0x34 corresponding to the destination IP address of 112.112.0.1, and the destination MAC address of 00-01-6C-06-A6-29, and then replace the destination IP address of 112.112.0.1, and the destination MAC address of 00-01-6C-06-A6-29 in the message to be transmitted, with 0x34, thus resulting in the new message.

The bus controller transmits the new message to the bus terminal, where in an embodiment of the invention, the bus controller can transmit the new message by broadcasting it; and all the bus terminals over the two-wire data transfer network receive the broadcasted message, and determine from the bus device addresses in Table 1 whether the bus device address in the message to be transmitted lies in the preset range of bus device addresses, and if the bus terminals determine that the message to be transmitted is a legal message, then the bus terminals may determine to which bus terminal the message to be transmitted is transmitted according to the binding relationships between an MAC address, an IP address, and a bus device address in the respective bus terminals; and if none of the bus terminals determines that there is a binding relationship between the bus device address in the message to be transmitted, and the MAC address and the IP address in any bus terminal, then the bus terminals may determine that the message to be transmitted is an illegal message, and then discard the message to be transmitted.

In the embodiment above of the invention, if the bus terminal determines that the bus device address in the message to be transmitted lies in the correspondence relationship table between an MAC address, an IP address, and a bus device address bound in the bus terminal, then the bus terminal may transmit the message to be transmitted to the upper layer above the physical layer of the bus terminal, i.e., the processor.

Optionally in an embodiment of the invention, if the upper layer above the physical layer is the processor, then the bus terminal may further convert the format of the message to be transmitted, determines the MAC address and the IP address corresponding to the bus device address in the new message according to the correspondence relationship table between an MAC address, an IP address, and a bus device address, replace the bus device address with the MAC address and the IP address, that is, recover the new message into the message to be transmitted, and transmit the message to be transmitted to the processor.

Second Embodiment

In an embodiment of the invention, the first node is the bus controller, and a second node is a bus terminal; and a device in the two-wire data transfer network transmits the message to be transmitted to the external network, and the bus controller receives the message to be transmitted, transmitted by the bus terminal, and determines the destination IP address and the destination MAC address of the message to be transmitted, that is, the destination IP address and the destination MAC address of the message to be transmitted, determined by the bus controller, are the IP address and the MAC address of the bus controller; and the bus controller determines the bus device address of the message to be transmitted, i.e., the device address of the bus controller, according to the correspondence relationship table in Table 1.

Optionally in an embodiment of the invention, the bus controller replaces the IP address and the MAC address in the message to be transmitted, with the bus device address corresponding to the message to be transmitted to thereby reduce the length of the message so as to improve the efficiency of transmitting the message.

The bus controller judges whether the determined bus device address lies in the preset range of bus device addresses, and if not, then the bus controller may discard the message to be transmitted; otherwise, the bus controller may judge whether the bus device address in the message to be transmitted is bound with the MAC address and the IP address in the three-dimension correspondence table stored in the bus controller, and if not, then the bus controller may determine that the security of the message to be transmitted is not high, and discard the message to be transmitted.

If the bus controller determines that the bus device address in the message to be transmitted is bound with the MAC address and the IP address in the three-dimension correspondence table stored in the bus controller, and if not, then the bus controller may transmit the message to be transmitted to the upper layer above the physical layer of the bus controller, i.e., the processor of the bus controller.

In the embodiment above of the invention, the bus controller further replaces the bus device address of the message to be transmitted, with the MAC address and the IP address before the message to be transmitted is transmitted to the processor of the bus controller, so that the format of the message transmitted by the bus controller is a message format that can be received by the external network.

In the embodiment above of the invention, optionally the bus controller further verifies whether the industry control protocol in the message to be transmitted lies in the industrial control whitelist, where the industrial control whitelist includes Ethernet/IP, PROFINET, POWERLINK, EtherCAT, SERCOSIII and other industry control protocols in an embodiment of the invention, before the message to be transmitted is transmitted to the processor of the bus controller. The bus controller judges from the industry control protocol header in the message to be transmitted whether the industry control protocol in the message to be transmitted lies in the industrial control whitelist, and if not, then the bus controller may discard the message to be transmitted; otherwise, the bus controller may transmit the message to be transmitted to the processor of the bus controller.

In order to describe the embodiments of the invention in further details, an example thereof will be described below.

Figure 4:
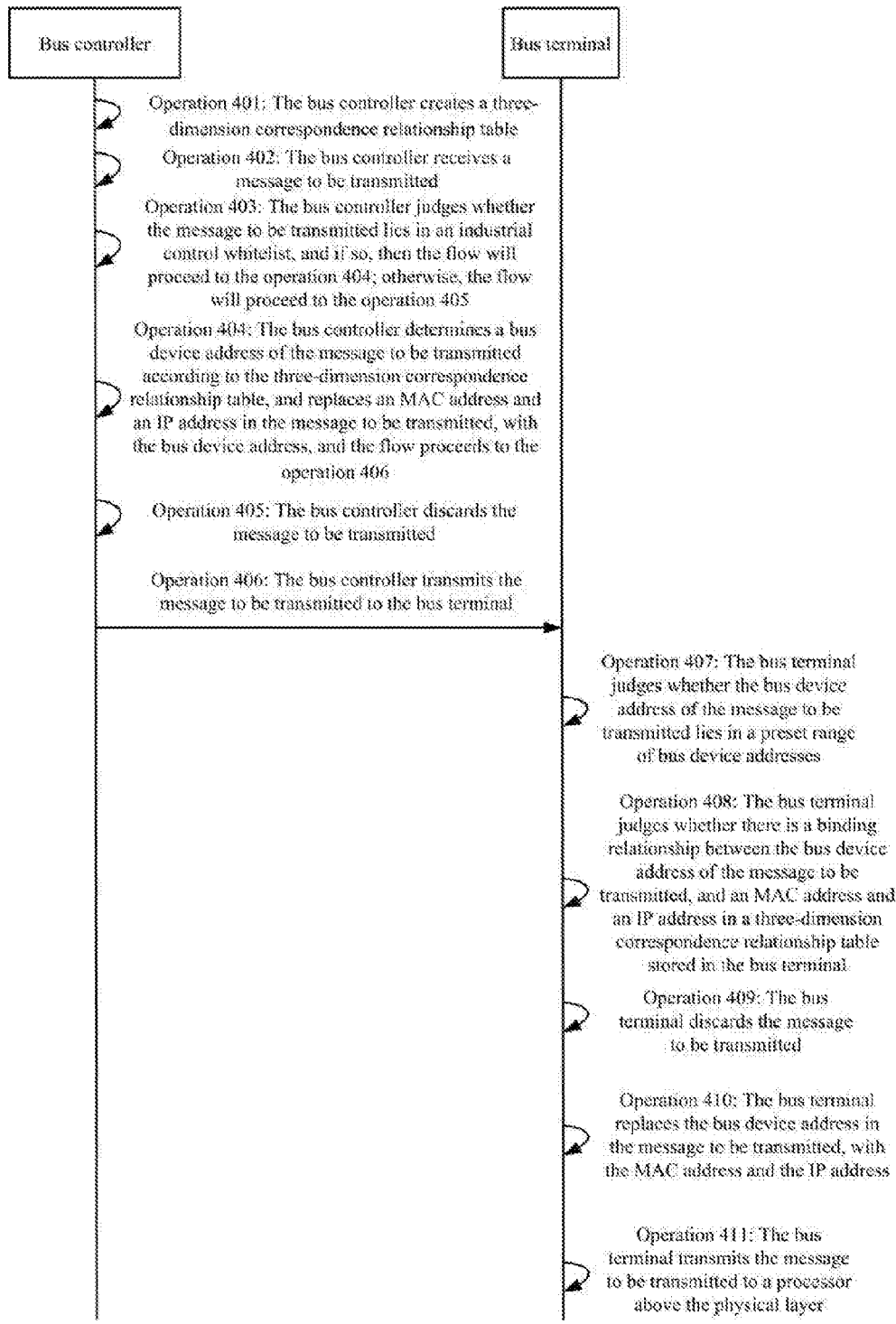
FIG. 4 is a flow chart of a method for deep data inspection over an industrial internet field broadband bus from an external network to a two-wire transfer network according to an embodiment of the invention.

As illustrated in FIG. 4, an embodiment of the invention provides a method for deep data inspection over an industrial internet field broadband bus, where a first node is a bus terminal, and a second node is a bus controller; and in an embodiment of the invention, the bus controller receives a message to be transmitted, transmitted from an external network, and transmits the message to be transmitted to the bus terminal, as illustrated in the following particular operations:

In the operation 401, the bus controller learns and records MAC and IP addresses of all the devices over a two-wire data transfer network, allocates bus device addresses for all the devices, and creates a three-dimension correspondence relationship table;

In the operation 402, the bus controller receives a message to be transmitted;

In the operation 403, the bus controller judges whether the message to be transmitted lies in an industrial control whitelist, and if so, then the flow will proceed to the operation 404; otherwise, the flow will proceed to the operation 405;

In the operation 404, the bus controller determines a bus device address of the message to be transmitted according to the three-dimension correspondence relationship table, and replaces an MAC address and an IP address in the message to be transmitted, with the bus device address, and the flow proceeds to the operation 406;

In the operation 405, the bus controller discards the message to be transmitted;

In the operation 406, the bus controller transmits the message to be transmitted to the bus terminal;

In the operation 407, the bus terminal judges whether the bus device address of the message to be transmitted lies in a preset range of bus device addresses, and if so, then the flow will proceed to the operation 408; otherwise, the flow will proceed to the operation 409;

In the operation 408, the bus terminal judges whether there is a binding relationship between the bus device address of the message to be transmitted, and an MAC address and an IP address in a three-dimension correspondence relationship table stored in the bus terminal, and if so, then the flow will proceed to the operation 410; otherwise, the flow will proceed to the operation 409;

In the operation 409, the bus terminal discards the message to be transmitted;

In the operation 410, the bus terminal searches the three-dimension correspondence relationship table for the MAC address and the IP address corresponding to the bus device address, and replaces the bus device address in the message to be transmitted, with the MAC address and the IP address; and In the operation 411, the bus terminal transmits the message to be transmitted to a processor above the physical layer.

Figure 5:
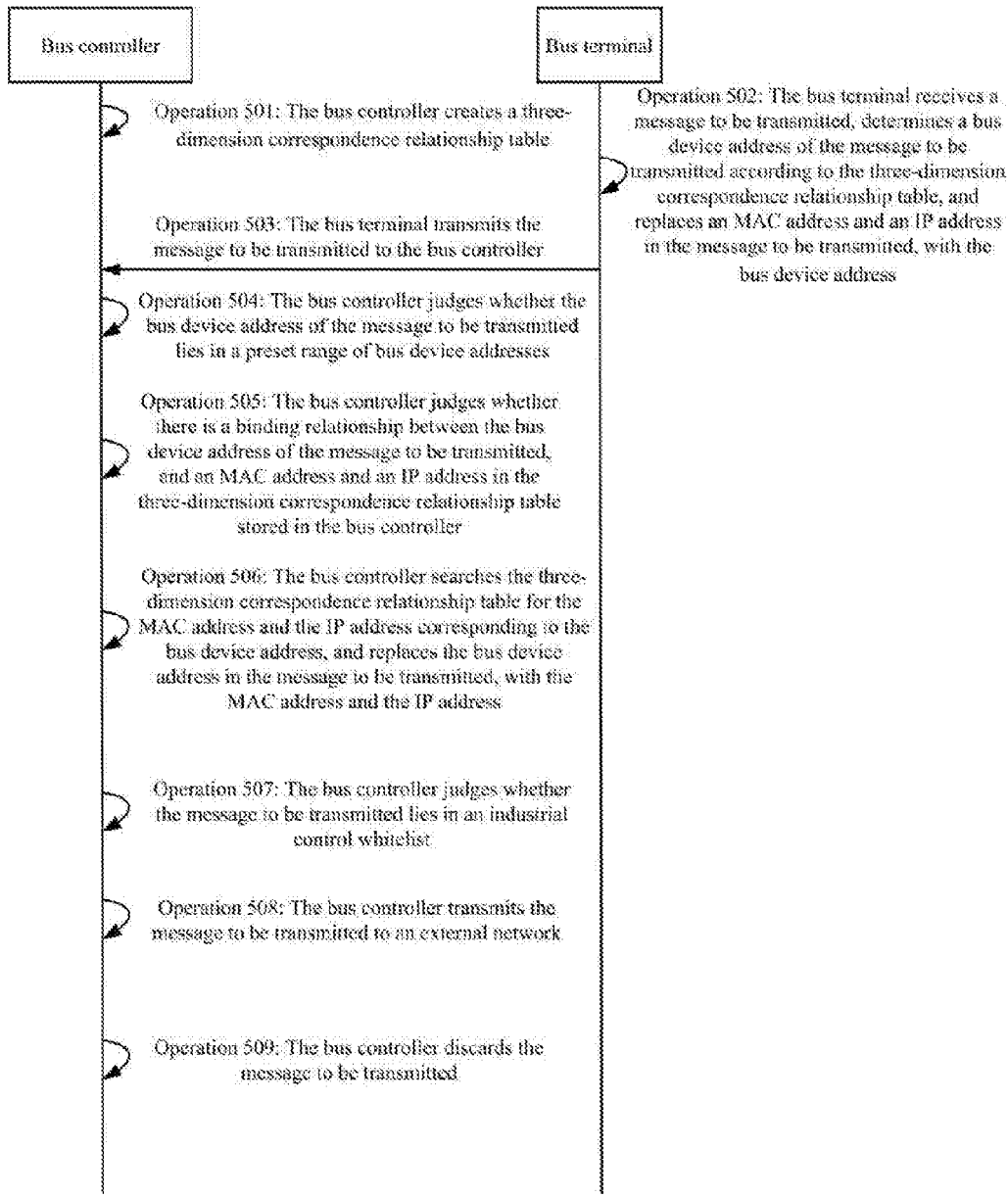
FIG. 5 is a flow chart of a method for deep data inspection over an industrial internet field broadband bus from a two-wire transfer network to an external network according to an embodiment of the invention.

As illustrated in FIG. 5, an embodiment of the invention provides a method for deep data inspection over an industrial internet field broadband bus, where a first node is a bus controller, and a second node is a bus terminal; and in an embodiment of the invention, the bus controller transmits a message to be transmitted to an external network, as illustrated in the following particular operations:

In the operation 501, the bus controller learns and records MAC and IP addresses of all the devices over a two-wire data transfer network, allocates bus device addresses for all the devices, and creates a three-dimension correspondence relationship table;

In the operation 502, the bus terminal receives a message to be transmitted, determines a bus device address of the message to be transmitted according to the three-dimension correspondence relationship table, and replaces an MAC address and an IP address in the message to be transmitted, with the bus device address;

In the operation 503, the bus terminal transmits the message to be transmitted to the bus controller;

In the operation 504, the bus controller judges whether the bus device address of the message to be transmitted lies in a preset range of bus device addresses, and if so, then the flow will proceed to the operation 505; otherwise, the flow will proceed to the operation 509;

In the operation 505, the bus controller judges whether there is a binding relationship between the bus device address of the message to be transmitted, and an MAC address and an IP address in the three-dimension correspondence relationship table stored in the bus controller, and if so, then the flow will proceed to the operation 506; otherwise, the flow will proceed to the operation 509;

In the operation 506, the bus controller searches the three-dimension correspondence relationship table for the MAC address and the IP address corresponding to the bus device address, and replaces the bus device address in the message to be transmitted, with the MAC address and the IP address;

In the operation 507, the bus controller judges whether the message to be transmitted lies in an industrial control whitelist, and if so, then the flow will proceed to the operation 508; otherwise, the flow will proceed to the operation 509;

In the operation 508, the bus controller transmits the message to be transmitted to a processor of the bus controller; and In the operation 509, the bus controller discards the message to be transmitted.

In an embodiment of the invention, the respective nodes can be synchronized in clock in a number of clock synchronization protocols including the Precision Time Protocol (PTP), the Network Time Protocol (NTP), the Simple Network Time Protocol (SNTP), or any one of other applicable clock synchronization protocols, and in an embodiment of the invention, firstly the bus controller is temporally synchronized using any one of the clock synchronization protocol above, and then the bus controller is temporally synchronized respectively with the other bus terminals, thus creating a reference clock for the two-wire data transfer network.

In order to ensure all the devices in the two-wire data transfer network to be temporally synchronized, in an embodiment of the invention, a synchronization interval of time can be further preset, and if the synchronization interval of time arrives, then the bus controller will be temporally synchronized with the other bus terminals.

Figure 6:
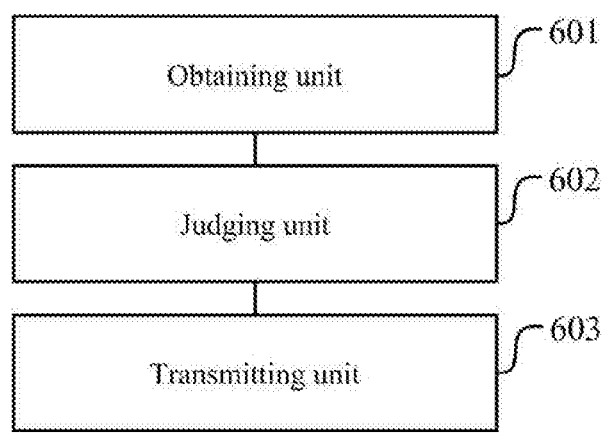
FIG. 6 is a schematic structural diagram of an apparatus for deep data inspection over an industrial internet field broadband bus according to an embodiment of the invention.

Based upon the same technical idea, as illustrated in FIG. 6, an embodiment of the invention further provides an apparatus for deep data inspection over an industrial internet field broadband bus according to an embodiment of the invention, the apparatus being applicable to a two-wire data transfer network, where the apparatus includes:

An obtaining unit 601 is configured to obtain a message to be transmitted;

A judging unit 602 is configured to judge whether a bus device address in the message to be transmitted lies in a preset range of bus device addresses; and A transmitting unit 603 is configured, if the bus device address lies in the preset range of bus device addresses, to transmit the message to be transmitted to a processor of the node.

Furthermore the judging unit 602 is further configured:

If the bus device address does not lie in the preset range of bus device addresses, to discard the message to be transmitted.

Furthermore the obtaining unit 601 is further configured:

To determine the preset range of bus device addresses according to configuration information.

Furthermore the obtaining unit 601 is configured:

For a first node to receive the message to be transmitted, transmitted by a second node;

Where the message to be transmitted is a message generated by the second node obtaining a data message, and then determining a bus device address corresponding to a destination IP address and a destination MAC address in the data message according to a three-dimension correspondence relationship between a bus device address, an MAC address, and an IP address using the destination IP address and the destination MAC address in the data message, and replacing the destination IP address and the destination MAC address in the data message with the bus device address.

Furthermore the judging unit 602 is further configured:

To determine that the destination IP address and the destination MAC address of the message to be transmitted are legal addresses.

Furthermore the obtaining unit 601 is further configured:

To determine the destination IP address and the destination MAC address in the message to be transmitted, corresponding to the bus device address in the message to be transmitted, according to the three-dimension correspondence relationship; and To replace the bus device address in the message to be transmitted, with the destination IP address and the destination MAC address.

Furthermore the node is a bus controller; and

The obtaining unit 601 is further configured:

To receive an IP address acquisition request including an MAC address of each of other nodes; and To allocate an IP address and a bus device address for each of the other nodes, and to determine a three-dimension correspondence relationship between the allocated IP address and bus device address, and the MAC address.

Furthermore if the node is the bus controller, then the judging unit 602 is further configured:

To judge whether an industry control protocol in the message to be transmitted lies in an industrial control whitelist, and if so, for the bus controller to transmit the message to be transmitted;

Otherwise for the bus controller to discard the message to be transmitted.

Furthermore if the first node is a bus terminal, then the obtaining unit 601 is further configured:

For the first node to receive the message to be transmitted, transmitted by a second node, where the message to be transmitted is a message generated by the second node obtaining a data message, and determining that an industry control protocol in the data message lies in the industrial control whitelist, and then replacing a destination IP address and a destination MAC address in the data message with the bus device address.

Furthermore the first node is a bus controller or a bus terminal, and the second node is a bus controller or a bus terminal; and the first node and the second node are not the bus controller or the bus terminal at the same time.

Furthermore the clock synchronization protocol includes any one of:

The Precision Time Protocol (PTP), the Network Time Protocol (NTP), and the Simple Network Time Protocol (SNTP).

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for deep data inspection over an industrial internet field broadband bus, the method being applicable to a two-wire data transfer network in which respective nodes are connected over the network according to their IP address, and the respective nodes are synchronized in clock, wherein the method comprises:

receiving, by a first node, a message to be transmitted, transmitted by a second node; wherein the message to be transmitted is a message generated by the second node obtaining a data message, and then determining a bus device address corresponding to a destination IP address and a destination MAC address in the data message according to the destination IP address and the destination MAC address in the data message and a three-dimension correspondence relationship between a bus device address, an MAC address, and an IP address, and replacing the destination IP address and the destination MAC address in the data message with the bus device address; wherein the three-dimension correspondence relationship is generated through learning, by a bus controller, the MAC addresses and the IP addresses of all bus terminals over the two-wire data transfer network, and then binding the MAC addresses and the IP addresses of the bus terminals with bus device addresses of the bus terminals allocated by the bus controller;

judging, by the first node, whether the bus device address in the message to be transmitted lies in a preset range of bus device addresses;

if the bus device address lies in the preset range of bus device addresses, then determining, by the first node, the destination IP address and the destination MAC address of the message to be transmitted, corresponding to the bus device address in the message to be transmitted, according to the three-dimension correspondence relationship;

determining, by the first node, that the destination IP address and the destination MAC address of the message to be transmitted are legal addresses; and replacing, by the first node, the bus device address in the message to be transmitted with the destination IP address and the destination MAC address;

transmitting, by the first node, the message to be transmitted to a processor of the first node;

wherein the first node is the bus controller or one of the bus terminals, and the second node is the bus controller or one of the bus terminals; and the first node and the second node are not the bus controller or one of the bus terminals at the same time.

2. The method according to claim 1, wherein after judging, by the first node, whether the bus device address in the message to be transmitted lies in the preset range of bus device addresses, the method further comprises:

if the bus device address does not lie in the preset range of bus device addresses, then discarding, by the first node, the message to be transmitted.

3. The method according to claim 2, wherein if the first node is a bus terminal, then:

receiving, by the first node, the message to be transmitted, transmitted by the second node comprises:

receiving, by the first node, the message to be transmitted, transmitted by the second node, wherein the message to be transmitted is a message generated by the second node obtaining the data message, and determining that an industry control protocol in the data message lies in an industrial control whitelist, and then replacing the destination IP address and the destination MAC address in the data message with the bus device address.

4. The method according to claim 1, wherein before receiving, by the first node, the message to be transmitted, transmitted by the second node, the method further comprises:

determining, by the first node, the preset range of bus device addresses according to configuration information.

5. The method according to claim 4, wherein if the first node is a bus terminal, then:

receiving, by the first node, the message to be transmitted, transmitted by the second node comprises:

receiving, by the first node, the message to be transmitted, transmitted by the second node, wherein the message to be transmitted is a message generated by the second node obtaining the data message, and determining that an industry control protocol in the data message lies in an industrial control whitelist, and then replacing the destination IP address and the destination MAC address in the data message with the bus device address.

6. The method according to claim 1, wherein if the first node is a bus controller, then:
- before receiving, by the first node, the message to be transmitted, transmitted by the second node, the method further comprises:
- receiving, by the first node, an IP address acquisition request comprising an MAC address of each of other nodes; and
- allocating, by the first node, an IP address and a bus device address for each of the other nodes, and determining the three-dimension correspondence relationship between the allocated IP address and bus device address, and the MAC address.

7. The method according to claim 6, wherein if the first node is the bus controller, then:
- after replacing, by the first node, the bus device address in the message to be transmitted, with the destination IP address and the destination MAC address, the method further comprises:
- judging, by the bus controller, whether an industry control protocol in the message to be transmitted lies in an industrial control whitelist, and if so, then transmitting, by the bus controller, the message to be transmitted; otherwise, discarding, by the bus controller, the message to be transmitted.

8. The method according to claim 1, wherein if the first node is a bus terminal, then:
- receiving, by the first node, the message to be transmitted, transmitted by the second node comprises:
- receiving, by the first node, the message to be transmitted, transmitted by theft second node, wherein the message to be transmitted is a message generated by the second node obtaining the data message, and determining that an industry control protocol in the data message lies in an industrial control whitelist, and then replacing the destination IP address and the destination MAC address in the data message with the bus device address.

9. The method according to claim 1, wherein the respective nodes are synchronized in clock using a clock synchronization protocol comprising any one of:
- the Precision Time Protocol (PTP), the Network Time Protocol (NTP), and the Simple Network Time Protocol (SNTP).

* * * * *